United States Patent [19]

Schneider

[11] 4,174,366

[45] Nov. 13, 1979

[54] METHOD OF MAKING REINFORCED CONCRETE

[75] Inventor: Ronald A. Schneider, Albany, Calif.

[73] Assignee: Chevron Research Company, San Francisco, Calif.

[21] Appl. No.: 920,437

[22] Filed: Jun. 29, 1978

Related U.S. Application Data

[63] Continuation of Ser. No. 781,591, Mar. 28, 1977, abandoned.

[51] Int. Cl.² ........................ B28B 23/04; B32B 13/02; B32B 13/14

[52] U.S. Cl. ................................. 264/228; 52/223 R; 52/309.16

[58] Field of Search ..................... 52/223, 223 R, 309; 242/56 A; 260/78; 200/61.06; 264/228, 342

[56] References Cited

U.S. PATENT DOCUMENTS

| | | | |
|---|---|---|---|
| 2,638,463 | 5/1953 | Ney et al. | 260/78 |
| 3,466,822 | 9/1969 | Hull et al. | 52/223 R |
| 3,637,457 | 1/1972 | Gothard et al. | 264/228 |
| 3,721,652 | 3/1973 | Barnes | 260/78 |
| 3,763,338 | 10/1973 | Tozer | 200/61.06 |
| 3,868,066 | 2/1975 | Baumer | 242/56 A |

*Primary Examiner*—James L. Ridgill, Jr.
*Attorney, Agent, or Firm*—D. A. Newell; John Stoner, Jr.; A. T. Bertolli

[57] ABSTRACT

Shaped concrete compositions can be pre-stressed to obtain improved flexural strength by embedding nylon-4 reinforcing bars in a wet-laid concrete prior to curing.

4 Claims, 1 Drawing Figure

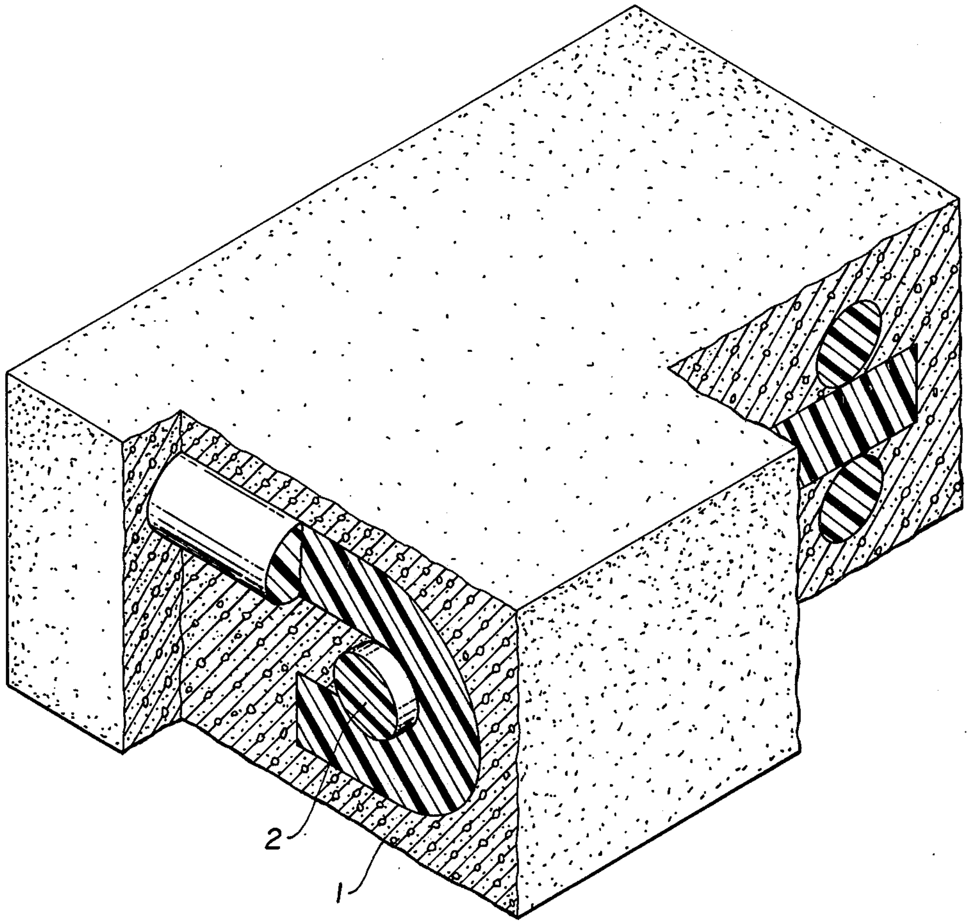
2
1

METHOD OF MAKING REINFORCED CONCRETE

This is a continuation of application Ser. No. 781,591, filed Mar. 28, 1977, now abandoned.

BACKGROUND OF THE INVENTION

This invention concerns reinforced concrete compositions. In particular, the invention concerns the use of nylon-4 reinforcing bars in wet-laid concrete compositions.

Concrete is a mixture of broken stone, gravel, cinders or slag, called "course aggregate", and sand or stone screenings, known as "fine aggregate" or "fines", with a cementing material, such as Portland cement. Concrete, reinforced by steel bars, is one of the most useful and important structural materials. Its attractiveness lies in its greater durability, requiring less maintenance; and the ease with which it is molded into shapes.

Reinforcing bars are usually constructed from steel and generally vary from about 0.25 to 1.5 inches in diameter. Round bars and more common; however, square bars are available. Steel reinforcing bars, nonetheless, present some problems. For example, steel bars are relatively rigid and are not easily adapted to irregular forms. They can also be relatively heavy and cumbersome to manipulate and position.

This invention is, in part, based upon the discovery that by substituting reinforcing bars constructed from nylon-4 for some or all of the steel reinforcing bars, the unique water-absorptive character of nylon-4 can be used to pre-stress the concrete, vastly improving its flexural strength.

Pre-stressing is achieved by embedding either wet or dry nylon-4 bars in a wet-laid concrete. The nylon-4 bars swell due to absorption of water, and consequently, as the concrete cures, the nylon-4 bars simultaneously shrink. The shrinkage of the bars pre-stresses the final concrete product, giving it significantly improved flexural strength.

The water-absorptive character of nylon-4 is well known. For example, U.S. Pat. No. 3,686,066, granted Aug. 22, 1972, to Peters describes shaped articles prepared by swelling nylon-4 with water and drying the swollen mass under pressure. While this characteristic has been used to prepare several articles, such as the humidity-responsive device described in U.S. Pat. No. 3,763,338, granted Oct. 2, 1973, to Tozer, it has not been used as reinforcing in concrete structures.

SUMMARY OF THE INVENTION

It has now been found that a pre-stressed shaped concrete composition comprising a wet-laid concrete having embedded therein at least one nylon-4 reinforcing bar, which is embedded in the wet-laid concrete prior to curing, has significantly improved flexural strength.

BRIEF DESCRIPTION OF THE DRAWING

The following detailed description of the invention is more readily appreciated when considered with the accompanying Figure which illustrates in cross-sectional perspective view the use of nylon-4 reinforcing rods in a prestressed concrete structure.

DETAILED DESCRIPTION OF THE INVENTION

Referring to the Figure, the pre-stressed shaped concrete composition of the present invention comprises a wet-laid concrete 1 having embedded therein at least one nylon-4 reinforcing bar 2. As used herein, the term "wet-laid concrete" encompasses mixtures of coarse and fine aggregate with a cementing material such as cement or asphalt, which when applied in an aqueous mixture hardens to form a solid shaped composition. The present invention is based primarily upon the discovery that concrete compositions can be made to have significantly improved flexural strength by embedding in the concrete composition at least one reinforcing bar manufactured from nylon-4.

Nylon-4 is the descriptive name for the polymer formed from 2-pyrrolidone, which is believed to be a linear polyamide having the structure:

$$\left[-\underset{\displaystyle H}{\underset{|}{N}}-(CH_2)_3-\underset{\displaystyle O}{\underset{\|}{C}}-\right]_n$$

wherein n is the degree of polymerization.

U.S. Pat. No. 2,638,463, granted May 12, 1953, to W. O. Ney et al, claims polypyrrolidone as a compound, a molding powder, a filler, a film, and also claims a process for producing a homopolymer from pyrrolidone in the presence of a catalyst.

U.S. Pat. No. 3,721,652, granted Mar. 20, 1973, to Barnes, incorporated herein by reference, describes a method for preparing nylon-4 and a method for melt extrusion of the polymer into fibers, films, and other shaped articles. In general, the polymerization of 2-pyrrolidone is carried out using an alkaline polymerization catalyst in the presence of carbon dioxide. The monomer may be polymerized at a temperature from about 18° C. to about 100° C. under a pressure ranging from subatmospheric to superatmospheric.

One of the advantages of nylon-4 is its suitability for melt extrusion into molded products which show greatly improved strength characteristics, while at the same time retaining the superior physical properties characteristic of polymers of 2-pyrrolidone. Accordingly, reinforcing bars for use in concrete compositions can be readily formed from the nylon-4 polymer.

The shape of the reinforcing bar is not critical to the present invention. However, for most applications, round bars are preferred. Suitable round nylon-4 reinforcing bars have diameters which vary from about 1½ inches to about 1/16 inch.

The placement and location of reinforcing rods in reinforced concrete compositions has been thoroughly examined. The Mining Engineers' Handbook, 3d Ed., Vol. 2, at Sec. 43-14, provides a thorough explanation of the size, spacing and usefulness of reinforcing bars in concrete compositions. In general, the nylon-4 reinforcing bars useful in the present invention should be located at least 0.75 times the width of the largest rod from the external surface of the shaped concrete composition. Where two or more nylon-4 reinforcing bars are used in the concrete structure, it is preferred that they be aligned parallel to one another at a distance of at least 1.5 times the width of the largest bar. For unusually large structures, a plurality of nylon-4 reinforcing bars can be embedded in the concrete and positioned to form a reinforcing matrix.

The pre-stressed shaped concrete compositions are prepared by embedding at least one nylon-4 reinforcing bar in the wet-laid concrete prior to curing, and thereafter curing the concrete. By embedding the nylon-4 reinforcing bar in the wet-laid concrete prior to curing, the nylon-4 swells by absorbing water. As the concrete composition begins to dry, the swollen nylon-4 begins to shrink. This shrinking procedure causes the concrete composition to be pre-stressed, thereby improving flexural strength.

EXAMPLE

The following example further illustrates practice of the present invention, and is not intended to limit the scope of the claims which follow.

Samples of rods extruded from nylon-4 and conventional nylon were selected so as to have approximately the same breaking strength (about 90 lb). The nylon-4 rods were 0.11–0.12 inch in diameter, fabricated from a melt of 99.5% nylon-4 and 0.5% Zytel 6/12. The conventional nylon was nylon-6,6, 0.10–0.11 inch in diameter.

Cages with approximate dimensions 1.5×1.5×7 inches were constructed from the rods by solvent-bonding with hot formic acid. Each cage had 16 rods in the long dimension, 4 to a side, with reasonably constant geometry in the central portion. The ends of these long rods were curved back about 180° for about 0.5 inch, so they would not pull out of the concrete. All welding and cross-pieces occurred near the ends, so as to leave in the central portion, where strength was to be measured, nothing but 16 unadulterated rods uniformly arranged.

The cages were soaked in water overnight and then centered in Teflon molds 2×2 inches wide and 7 inches deep. Concrete was prepared from Type I cement, 30-mesh Crystal Amber grade 0 sand, Clemco #3 course sand, and water in the weight ratio 1.0:1.5:1.5:0.53. The concrete was poured into two molds containing nylon-4 cages, two containing nylon-6,6 cages, and one containing no cage.

Three days after pouring, the samples were removed from the molds and stored in air in a covered container over free-standing water at room temperature. After 3 weeks, the samples were placed in an oven at 140° F. for 7 days. The samples were then cooled in air for 1 day and tested for flexural strength by the centerpoint loading technique described in ASTM Standard Method C293, with a cross-head speed of 0.1 in/min. The following results were obtained:

| Sample | Flexural Strength, psi |
|---|---|
| No reinforcement | 700 |
| Nylon-6,6 rods | 830, 880 |
| Nylon-4 rods | 990, 1040 |

What is claimed is:

1. A method of pre-stressing a wet-laid concrete which comprises first soaking in water overnight then embedding at least one nontensioned polypyrrolidone reinforcing bar in wet-laid concrete, said embedding being effected by locating said nontensioned polypyrrolidone reinforcing bar within the concrete at least 0.75 times the width of the reinforcing bar from the surface of the wet-laid concrete said nontensioned polypyrrolidone reinforcing bar having a diameter of at least 1/16-inch, and thereafter curing the so-treated wet-laid concrete.

2. A method of pre-stressing a wet-laid concrete which comprises first soaking in water overnight then embedding at least one nontensioned polypyrrolidone reinforcing bar in wet-laid concrete, said embedding being effected by locating said nontensioned polypyrrolidone reinforcing bar at least 0.75 times the width of the reinforcing bar from the external surface of the wet-laid concrete, and thereafter curing the so-treated wet-laid concrete.

3. A method of pre-stressing a wet-laid concrete which comprises first soaking in water overnight then embedding at least two nontensioned polypyrrolidone reinforcing bars of different widths in wet-laid concrete, said embedding being effected by aligning the reinforcing bars and by locating said non-tensioned polypyrrolidone bar within the concrete at least 0.75 times the width of the reinforcing bar from the surface of the wet-laid concrete parallel to one another at a distance of at least 1.5 times the width of the largest bar, and thereafter curing the so-treated wet-laid concrete.

4. A method of pre-stressing a wet-laid concrete which comprises first soaking in water overnight then embedding a plurality of nontensioned polypyrrolidone reinforcing bars in wet-laid concrete, and positioning the nontensioned polypyrrolidone reinforcing bars and forming a reinforcing matrix, and centering said matrix in the concrete and thereafter curing the so-treated wet-laid concrete.

* * * * *

UNITED STATES PATENT AND TRADEMARK OFFICE
CERTIFICATE OF CORRECTION

PATENT NO. : 4,174,366

DATED : November 13, 1979

INVENTOR(S) : Ronald A. Schneider

It is certified that error appears in the above-identified patent and that said Letters Patent are hereby corrected as shown below:

Column 1, line 24, "and" should read --are--.

Column 3, line 40, "course" should read --coarse--.

Column 4, lines 31-41, Claim 3 should read:

--3. A method of pre-stressing a wet-laid concrete which comprises first soaking in water overnight then embedding at least two nontensioned polypyrrolidone reinforcing bars of different widths in wet-laid concrete, said embedding being effected by aligning the reinforcing bars parallel to one another at a distance of at least 1.5 times the width of the largest bar, and by locating said nontensioned polypyrrolidone bar within the concrete at least 0.75 times the width of the reinforcing bar from the surface of the wet-laid concrete, and thereafter curing the so-treated wet-laid concrete.--

Signed and Sealed this

*First* Day of *April 1980*

[SEAL]

*Attest:*

SIDNEY A. DIAMOND

*Attesting Officer* *Commissioner of Patents and Trademarks*